United States Patent
Yanagidate

(10) Patent No.: US 9,414,419 B2
(45) Date of Patent: Aug. 9, 2016

(54) WIRELESS DEVICE

(71) Applicant: OLYMPUS CORPORATION, Tokyo (JP)

(72) Inventor: Masaharu Yanagidate, Sagamihara (JP)

(73) Assignee: OLYMPUS CORPORATION, Tokyo (JP)

( * ) Notice: Subject to any disclaimer, the term of this patent is extended or adjusted under 35 U.S.C. 154(b) by 126 days.

(21) Appl. No.: 14/252,133

(22) Filed: Apr. 14, 2014

(65) Prior Publication Data

US 2014/0218547 A1 Aug. 7, 2014

Related U.S. Application Data

(63) Continuation of application No. PCT/JP2012/073351, filed on Sep. 12, 2012.

(30) Foreign Application Priority Data

Oct. 27, 2011 (JP) .................................. 2011-236022

(51) Int. Cl.
*H04B 15/00* (2006.01)
*H04W 76/02* (2009.01)
(Continued)

(52) U.S. Cl.
CPC ........... *H04W 76/021* (2013.01); *H04B 7/0617* (2013.01); *H04N 5/247* (2013.01); *H04W 76/023* (2013.01); *H04W 16/28* (2013.01); *H04W 92/08* (2013.01)

(58) Field of Classification Search
CPC . H04W 76/021; H04W 76/023; H04W 16/28; H04W 92/08; H04B 7/0617; H04N 5/247
USPC ............ 455/63.4, 63.1, 62, 107, 25; 342/359, 342/360, 361
See application file for complete search history.

(56) References Cited

U.S. PATENT DOCUMENTS 5,708,441 A * 1/1998 Kanai ...................... H01Q 3/26
 342/359
7,554,936 B2 * 6/2009 Furukawa .............. H04B 7/155
 370/315

(Continued)

FOREIGN PATENT DOCUMENTS

JP 07-087011 A 3/1995
JP 08-167871 A 6/1996
(Continued)

OTHER PUBLICATIONS

Extended European Search Report dated May 4, 2015, issued in corresponding EP Patent Application No. 12843180.6 (9 pages).

(Continued)

*Primary Examiner* — Khai M Nguyen
(74) *Attorney, Agent, or Firm* — Westerman, Hattori, Daniels & Adrian, LLP

(57) ABSTRACT

This wireless device has: a variable directivity antenna having variable directivity characteristics; a generating unit, which generates control information to be used in connection setting processing from radio waves transmitted from other wireless device before completion of the connection setting processing, and received by the variable directivity antenna, and which generates data for data processing from the radio waves transmitted from other wireless device after the completion of the connection setting processing and received by the variable directivity antenna; a connection setting unit, which performs the connection setting processing with respect to other wireless device identified by means of the control information; and an antenna control unit, which controls the directivity direction of the variable directivity antenna to a predetermined direction during a period from a time when the connection setting unit started the connection setting processing to a time when the connection setting unit completes the connection setting processing.

13 Claims, 15 Drawing Sheets

(51) Int. Cl.
  *H04B 7/06* (2006.01)
  *H04N 5/247* (2006.01)
  *H04W 16/28* (2009.01)
  *H04W 92/08* (2009.01)

(56) References Cited

U.S. PATENT DOCUMENTS

| | | | |
|---|---|---|---|
| 2001/0048389 A1* | 12/2001 | Nakagawa | H04B 1/709 342/378 |
| 2010/0151792 A1 | 6/2010 | Ishioka | |
| 2010/0245173 A1 | 9/2010 | Honda | |
| 2011/0045785 A1* | 2/2011 | Sutskover | H01Q 3/26 455/69 |
| 2011/0249615 A1 | 10/2011 | Soffer et al. | |
| 2013/0122820 A1* | 5/2013 | Horio | H04B 17/364 455/67.11 |

FOREIGN PATENT DOCUMENTS

| | | |
|---|---|---|
| JP | 2001-028642 A | 1/2001 |
| JP | 2002-217914 A | 8/2002 |
| JP | 3441422 B2 | 9/2003 |
| JP | 2004-328273 A | 11/2004 |
| JP | 2006-042160 A | 2/2006 |
| JP | 2007-067723 A | 3/2007 |
| JP | 2007-525910 A | 9/2007 |
| JP | 2011-029730 A | 2/2011 |
| WO | 2005/086502 A1 | 9/2005 |

OTHER PUBLICATIONS

International Search Report, dated Dec. 11, 2012, issued in corresponding application No. PCT/JP2012/073351.
Notice of Reasons for Rejection dated Aug. 25, 2015, issued in counterpart Japanese Application No. 2011-236022, with English translation (12 pages).

* cited by examiner

RADIO WAVE STRENGTHS ARE COMPARED AND PROCESS OF ESTABLISHING TEMPORARY CONNECTION TO VIDEO CAMERA OF STRONGER RADIO WAVE STRENGTH IS PERFORMED

WIRELESS DEVICE

CROSS REFERENCE TO RELATED APPLICATIONS

This application is a continuation application based on a PCT Patent Application No. PCT/JP2012/073351, filed Sep. 12, 2012, whose priority is claimed on Japanese Patent Application No. 2011-236022, filed Oct. 27, 2011, the entire content of which are hereby incorporated by reference.

BACKGROUND OF THE INVENTION

1. Field of the Invention

The present invention relates to a wireless device which performs wireless communication.

2. Description of the Related Art

As a system which performs wireless communication by switching a wireless connection among a plurality of wireless devices, a communication system having a connection control device which sets up the connection between the wireless devices has been developed. For example, in Japanese Patent No. 3441422, a process in which a connection control device collects an identifier (ID) from a wireless device within a communicable range, specifies each wireless device using the collected ID, and performs the connection setup based on content of a connection instruction by an operator is disclosed.

Recently, wireless devices having a variable directivity antenna having variable directivity has been developed and various methods of setting up a connection in a communication system including such a wireless device having the variable directivity antenna have been developed. For example, in Japanese Unexamined Patent Application, First Publication No. 2002-217914, a process in which a wireless device having a non-directional antenna and a variable directivity antenna finds and selects a connection target using the non-directional antenna in the connection setup and performs communication using the directivity antenna during data communication after the connection setup is disclosed.

SUMMARY

According to an embodiment of the present invention, a wireless device includes a variable directivity antenna having variable directivity characteristics; a generation section configured to generate control information to be used in a connection setup process from radio waves transmitted from another wireless device before completion of the connection setup process and received by the variable directivity antenna and generate data for data processing from the radio waves transmitted from the other wireless device after the completion of the connection setup process and received by the variable directivity antenna; a connection setup section configured to perform the connection setup process for the other wireless device identified from the control information; and an antenna control section configured to control a directivity direction of the variable directivity antenna in a predetermined direction during a period from when the connection setup section starts the connection setup process to when the connection setup section completes the connection setup process.

The wireless device may further include a determination section configured to determine whether a communication environment deteriorates, wherein the connection setup section stops the connection setup process for the other wireless device when the determination section determines that the communication environment deteriorates while the connection setup process for the other wireless device is performed.

Upon stopping the connection setup process for a first wireless device, the connection setup section may perform the connection setup process for a second wireless device different from the first wireless device.

When a plurality of other wireless devices have been identified from the control information, the connection setup section may identify an elapsed time from when the other wireless devices have been reset based on the control information, and perform the connection setup process by giving priority to the other wireless device for which the elapsed time is short rather than the other wireless device for which the elapsed time is long.

When a plurality of other wireless devices are identified from the control information, the connection setup section may perform the connection setup process for a wireless device related to strongest radio wave strength of radio waves received from the plurality of other wireless devices.

The wireless device may further include a direction reception section configured to receive direction information serving as an indicator of the directivity direction of the variable directivity antenna from an operator, wherein the antenna control section controls the directivity direction of the variable directivity antenna in a direction represented by the direction information.

The wireless device may further include a processing section configured to process the data by starting any one of a plurality of applications which process the data generated by the generation section, wherein the processing section starts an application corresponding to the other wireless device after the connection setup process.

The wireless device may further include a processing section configured to process the data by starting any one of a plurality of applications which process the data generated by the generation section, wherein, when a plurality of other wireless devices have been identified from the control information, the connection setup section performs the connection setup process for the other wireless device corresponding to the application started by the processing section.

The antenna control section may control the directivity direction of the variable directivity antenna in a predetermined direction and control a spread of directivity characteristics of the variable directivity antenna within a predetermined range.

The antenna control section may control the directivity direction of the variable directivity antenna in a direction perpendicular to a plane on which the variable directivity antenna is disposed.

DETAILED DESCRIPTION OF THE PREFERRED EMBODIMENTS

Hereinafter, embodiments of the present invention will be described with reference to the drawings.

First Embodiment

Figure 1:
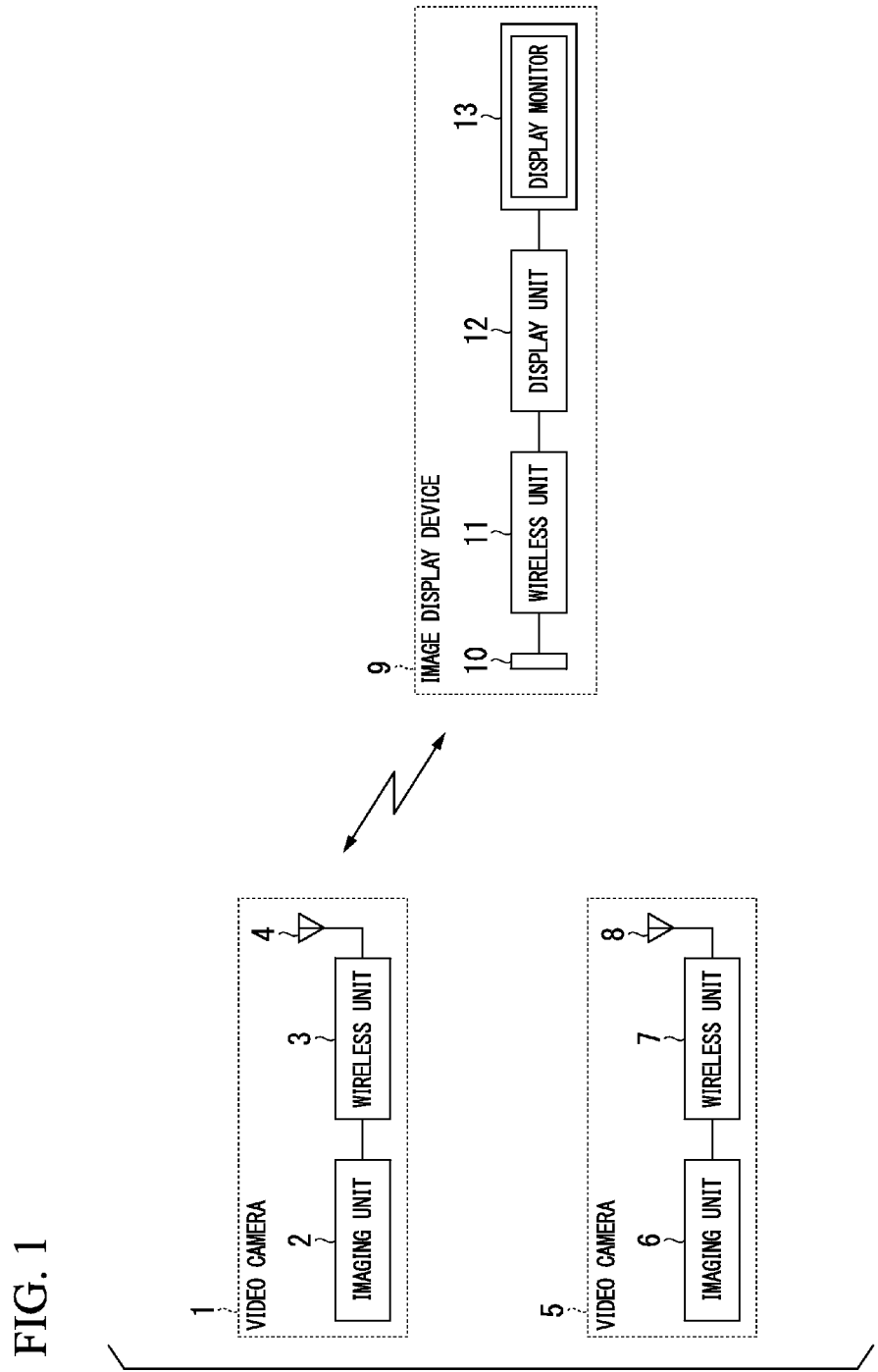
FIG. 1 is a block diagram illustrating a configuration of an image data communication system according to a first embodiment of the present invention.

First, the first embodiment of the present invention will be described. In this embodiment, an example in which the present invention is applied to an image data communication system including two video cameras, each of which transmits an image in wireless communication, and one display device which receives and displays the image transmitted in the wireless communication will be described. FIG. 1 is a block diagram illustrating a configuration of the image data communication system according to this embodiment. First, the configuration and operation of the image data communication system will be described using FIG. 1.

(Configuration)

The image data communication system illustrated in FIG. 1 includes two video cameras (video cameras 1 and 5) and one image display device 9. The video cameras 1 and 5 are devices which wirelessly transmit captured image data as communication data, and have the same configuration. The image display device 9 performs wireless communication by selecting either of the video cameras 1 and 5, receives communication data from the selected video camera, and displays an image by restoring image data from the communication data. The image display device 9 is an application example of the wireless device of the present invention.

The video camera 1 includes an imaging unit 2, a wireless unit 3, and an antenna 4. The imaging unit 2 outputs image data by performing an imaging process. The wireless unit 3 converts the image data output from the imaging unit 2 into communication data and wirelessly transmits the communication data via the antenna 4. The antenna 4 is a non-directional antenna. The video camera 5 includes an imaging unit 6, a wireless unit 7, and an antenna 8. Because the configuration of the video camera 5 is the same as the configuration of the video camera 1, description thereof is omitted.

The image display device 9 includes an array antenna 10, a wireless unit 11, a display unit 12, and a display monitor 13. The array antenna 10 includes a plurality of antenna elements, and is a variable directivity antenna which has variable directivity and transmits and receives radio waves. The directivity of the array antenna 10 is controlled by the wireless unit 11. Because details of an operation principle related to control of the directivity of the array antenna are well known, description thereof is omitted.

The wireless unit 11 is connected to the array antenna 10, and performs control of directivity of the array antenna 10, a process of setting up a connection to the video camera, and a process of receiving communication data transmitted from the video camera after the connection. The communication data received by the wireless unit 11 is reconfigured as image data, and the image data is transmitted to the display unit 12. The display unit 12 generates a video signal by performing image processing on the image data, and outputs the video signal to the display monitor 13. The display monitor 13 displays an image based on the video signal.

The image data communication system according to this embodiment performs a connection setup operation and an imaging display operation. The connection setup operation is an operation of performing a connection setup process by selecting a video camera of a connection partner (connection target). After issuing an instruction for starting the connection setup process to the image display device 9, the operator determines the video camera to be selected by directing the front side of the array antenna 10 toward the video camera of the connection partner. In order to enable this operation, the image display device 9 has a structure in which the array antenna 10 and the wireless unit 11 are integrated and an operation of directing the direction of the antenna toward an arbitrary device is possible. Also, the directivity of the array antenna 10 is controlled by the wireless unit 11. During connection setup, a directivity direction is set to a front direction of the array antenna 10 and a directivity angle (half-value angle) is set to a predetermined angle (several tens of degrees). The front direction of the array antenna 10 in this embodiment is a direction perpendicular to the plane of a printed substrate on which an array antenna is formed.

The imaging display operation is an operation in which the image display device 9 displays an image based on image data captured by the video camera of the connection partner. After a wireless signal wirelessly transmitted from the video camera is received by the array antenna 10 as radio waves and demodulated by the wireless unit 11 into communication data, the communication data is reconfigured as image data. The image data obtained through the reconfiguration is converted by the display unit 12 into a video signal, and an image is displayed by the display monitor 13. During the imaging display operation, the directivity of the array antenna 10 is controlled toward the video camera designated as the connection partner so that reception of the wireless signal is optimally performed.

Figure 2:
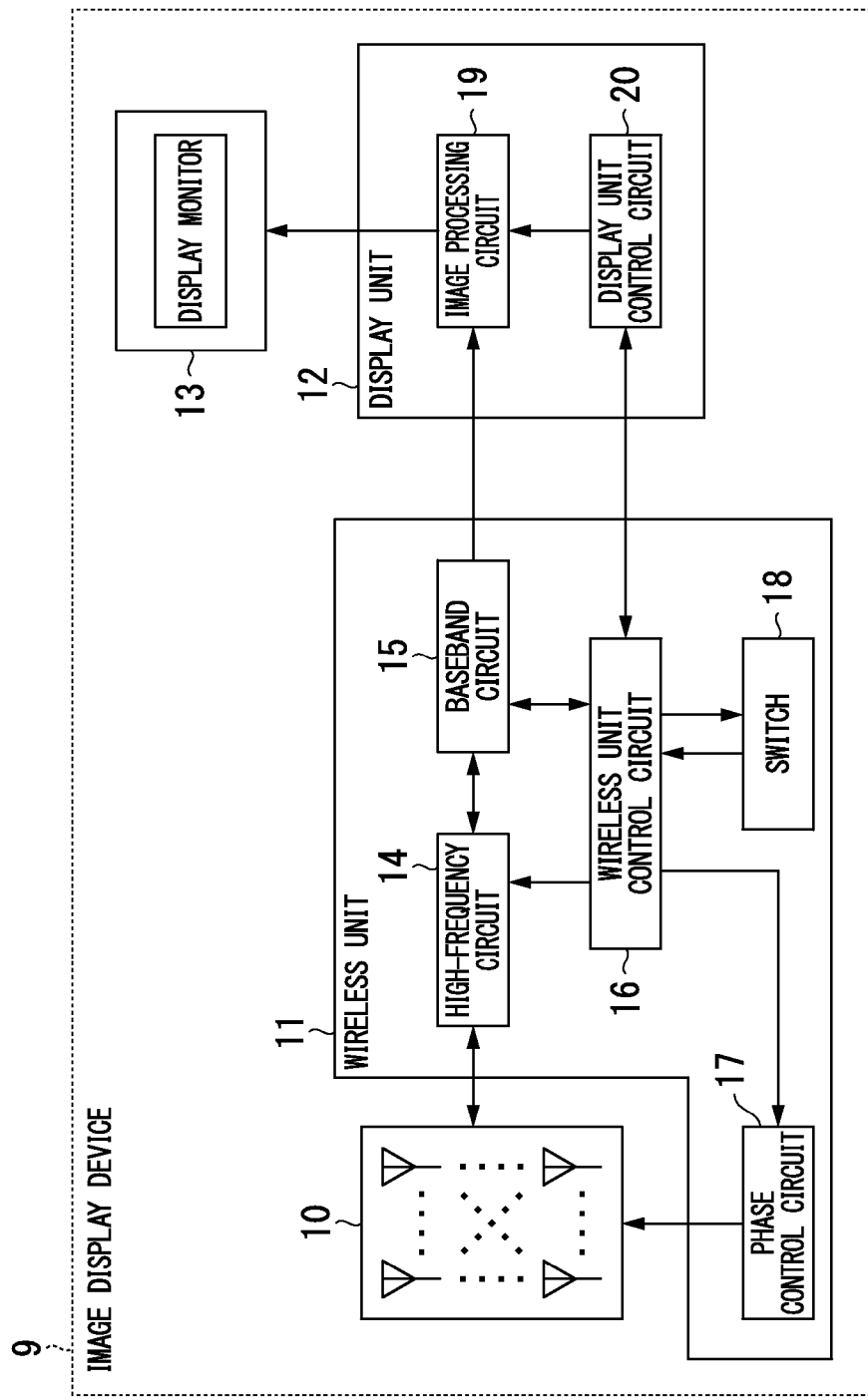
FIG. 2 is a block diagram illustrating a configuration of an image display device according to the first embodiment of the present invention.

FIG. 2 is a block diagram illustrating a configuration of the image display device 9. As illustrated in FIG. 2, the image display device 9 includes the array antenna 10, the wireless unit 11, the display unit 12, and the display monitor 13.

The wireless unit 11 includes a high-frequency circuit 14, a baseband circuit 15, a wireless unit control circuit 16, a phase control circuit 17, and an operation switch 18. The high-frequency circuit 14 is connected to the array antenna 10, and performs high-frequency processing. The baseband circuit 15 is connected to the high-frequency circuit 14, and performs baseband processing. The high-frequency circuit 14 and the baseband circuit 15 (data generation section) perform a process. Thereby, control information (ID information or elapsed time information to be described later) to be used in the connection setup process is generated from radio waves transmitted from the video camera before completion of the connection setup process and received by the array antenna 10, and image data for image processing (data processing) is generated from radio waves transmitted from the video camera after the completion of the connection setup process and received by the array antenna 10. The wireless unit control circuit 16 controls the overall operation of the wireless unit 11. The phase control circuit 17 controls the directivity of the array antenna 10. The operation switch 18 is a switch which is operable by the operator, and transfers an instruction from the operator to the wireless unit control circuit 16.

The display unit 12 includes an image processing circuit 19 and a display unit control circuit 20. The image processing circuit 19 receives image data after the baseband processing output from the wireless unit 11, performs image processing on the image data, and outputs an image processing result as a video signal. The display unit control circuit 20 controls the image processing circuit 19 and performs the overall control of the image display device 9 in cooperation with the wireless unit control circuit 16 of the wireless unit 11.

(Operation)

Next, the operation of the image data communication system will be described. First, the connection setup operation will be described. During the connection setup operation, the image display device 9 performs the connection setup process by selecting the video camera of the connection partner. The connection setup process is performed with the video camera located in the front direction of the array antenna 10.

After the operator has issued an instruction for starting the connection setup process by pressing the operation switch 18, the video camera to be connected is designated by directing the front side of the array antenna 10 toward the video camera of the connection partner. The operation switch 18 is connected to the wireless unit control circuit 16, and the wireless unit control circuit 16 recognizes the instruction for starting the connection setup process by pressing the operation switch 18.

Upon recognizing the instruction for starting the connection setup process, the wireless unit control circuit 16 instructs the phase control circuit 17 to control the directivity of the array antenna 10. The phase control circuit 17 receiving the instruction from the wireless unit control circuit 16 sets the directivity direction to the front direction of the array antenna 10 as described above.

Thereafter, the wireless unit control circuit 16 controls the high-frequency circuit 14 and the baseband circuit 15, and performs the connection setup process with the video camera. The connection setup process to be performed by the wireless unit control circuit 16 will be described in detail later.

Next, the imaging display operation will be described. During the imaging display operation, the phase control circuit 17 controls the directivity of the array antenna 10 and the directivity direction is controlled in a direction in which there is a video camera of the connection partner. The directivity direction is controlled so that reception sensitivity of a wireless signal is optimized by the array antenna 10, the high-frequency circuit 14, the wireless unit control circuit 16, and the phase control circuit 17. Because a method of controlling the directivity direction is well known, further description is omitted.

After the wireless signal received by the array antenna 10 is demodulated by the high-frequency circuit 14 into communication data, the communication data is reconfigured by the baseband circuit 15 as image data and the image data is output to the display unit 12. The image data is converted by the display unit 12 into a video signal, and an image is displayed by the display monitor 13.

FIGS. 3A, 3B, 4A, and 4B illustrate states of the connection setup process when a plurality of video cameras which are connection partners are in separate directions when viewed from the image display device 9. Using FIGS. 3A, 3B, 4A, and 4B, an example in which the image display device 9 changes a connection so that the connection to the video camera 5 is made from a state in which the connection to the video camera 1 is made will be described.

Figure 3A:
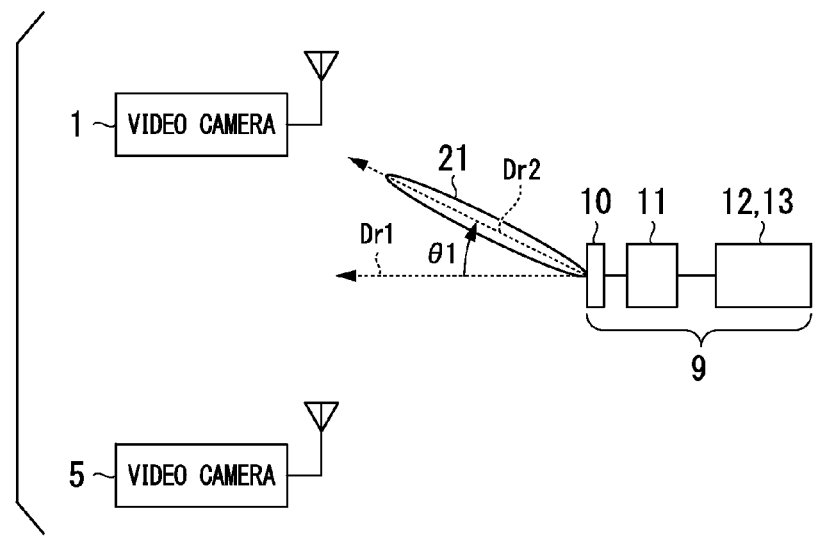
FIG. 3A is a reference diagram illustrating a state of a connection setup process in the first embodiment of the present invention.

FIG. 3A illustrates the state in which the image display device 9 and the video camera 1 are connected. In FIG. 3A, a directivity pattern 21 represents a radiation characteristic of the array antenna 10. As illustrated, the directivity pattern 21 is set in a direction Dr2 of an angle θ1 based on a front direction Dr1 of the array antenna 10 (the front direction of the antenna) in a state in which a directivity angle has been narrowed down to a predetermined angle defined as a directivity angle during the imaging display operation.

Figure 3B:
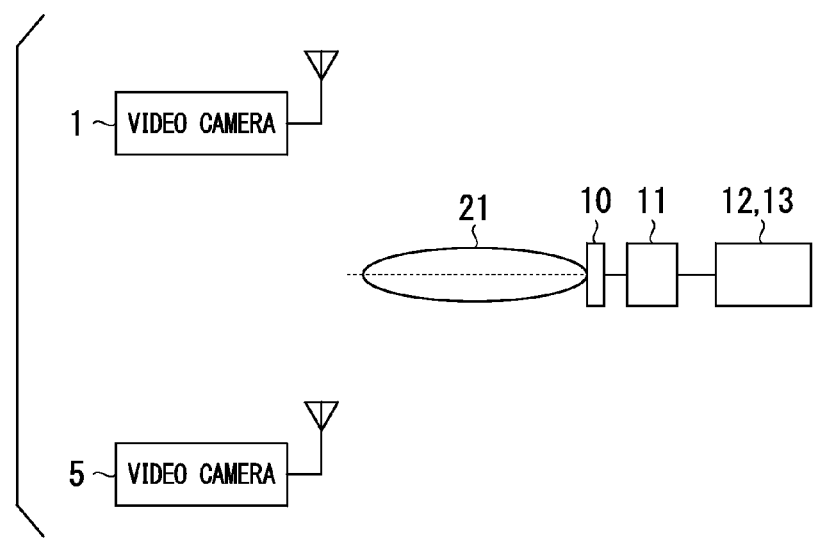
FIG. 3B is a reference diagram illustrating a state of the connection setup process in the first embodiment of the present invention.

FIG. 3B illustrates a state in which the operation switch 18 of the image display device 9 is pressed and the connection setup process is started. When the connection setup process is started, the connection to the video camera 1 is disconnected. The directivity pattern 21 is set in the direction of the front side (0 degrees) of the antenna in a state in which the directivity angle has been narrowed down to a predetermined angle defined as a directivity angle during the connection setup process. Because there is no video camera at the front side of the antenna in the state of FIG. 3B, the connection setup with the video camera is not started.

Figure 4A:
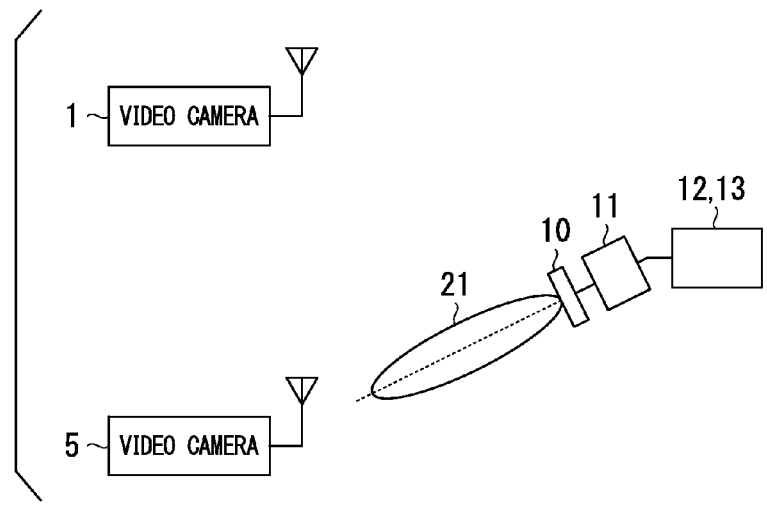
FIG. 4A is a reference diagram illustrating a state of the connection setup process in the first embodiment of the present invention.

FIG. 4A illustrates a state in which the operator changes positions of the array antenna 10 and the wireless unit 11 and the front side of the array antenna 10 is directed to the video camera 5. When there is a video camera at the front side of the array antenna 10, the connection setup process with the video camera is started and a temporary connection is made. In the temporary connection, communication with the video camera is performed in a state in which the directivity direction of the directivity pattern 21 is fixed to the direction of the front side of the antenna. At this time, on the display monitor 13, an image is displayed based on device information (a device model name, an identification name assigned by the operator, or the like) received from the video camera of the partner of the temporary connection or image data captured by the video camera of the partner of the temporary connection. The operator checks whether the image display device 9 is connected to a desired video camera by observing the display monitor 13. When the state of the temporary connection continues during a predetermined period, the transition to the state of a main connection is made.

Figure 4B:
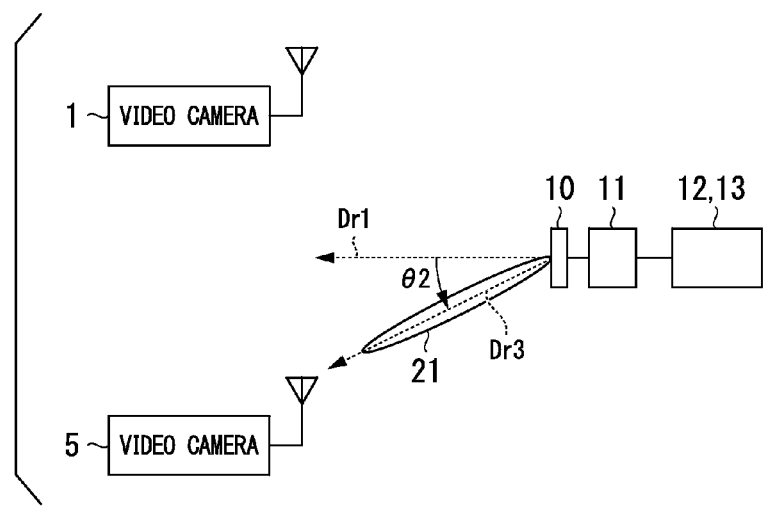
FIG. 4B is a reference diagram illustrating a state of the connection setup process in the first embodiment of the present invention.

FIG. 4B illustrates the state of the main connection. FIG. 4B illustrates the state in which the main connection to the video camera 5 has been made. In the main connection, the directivity pattern 21 is controlled so that communication with a selected video camera is optimally performed regardless of positions and directions of the array antenna 10 and the wireless unit 11. Thus, when the positions of the array antenna 10 and the wireless unit 11 are returned to the original positions from the state of FIG. 4A as illustrated, the directivity pattern 21 is set in a direction Dr3 of an angle θ2 based on the front direction Dr1 of the array antenna 10 (the direction of the front side of the antenna).

Figure 5:
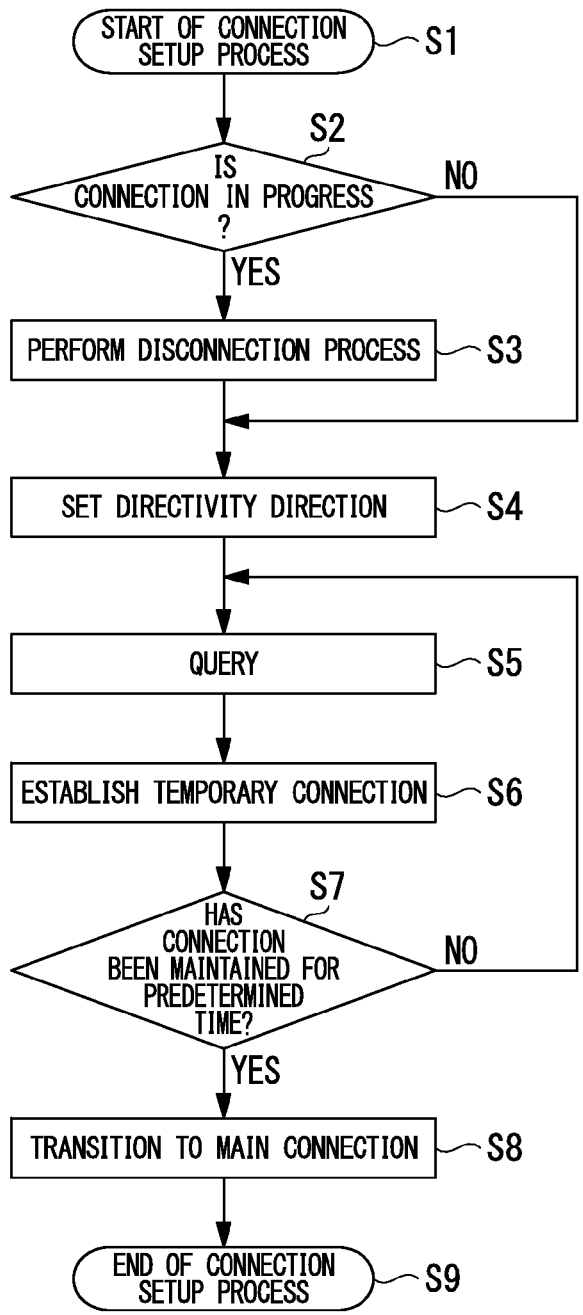
FIG. 5 is a flowchart illustrating an operation of a wireless unit control circuit of an image display device according to the first embodiment of the present invention.

FIG. 5 illustrates an operation of the wireless unit control circuit 16 in the connection setup process described using FIGS. 3A, 3B, 4A, and 4B. When the operation switch 18 of the image display device 9 is pressed, the wireless unit control circuit 16 starts the connection setup process (S1). Subsequently, the wireless unit control circuit 16 executes a determination process S2 of determining whether the connection to the video camera is in progress based on control information output from the baseband circuit 15. When the connection is in progress, the wireless unit control circuit 16 executes a disconnection process S3 of disconnecting the connection to the video camera.

After the execution of the disconnection process S3 or when the connection to the video camera is not in progress, the wireless unit control circuit 16 executes a directivity direction setting process S4. In the directivity direction setting process S4, the wireless unit control circuit 16 narrows a directivity angle representing the spread (beam width) of the directivity pattern 21 down to a predetermined angle and sets the directivity direction of the directivity pattern 21 to a direction of the front side (0 degrees) of the antenna.

Subsequently, the wireless unit control circuit 16 executes a query process S5. In the query process S5, information to be used in the connection setup process such as ID information (identification information) set for each video camera is collected from a connectable video camera. The wireless unit control circuit 16 collects ID information from control information output from the baseband circuit 15. When there is a video camera in a direction of the front side of the antenna, ID information of one or more connectable video cameras is collected and the wireless unit control circuit 16 selects any one piece of the collected ID information, and executes a temporary connection process S6 with the video camera having the selected ID information. Because the ID information of the connectable video camera is not collected when there is no video camera in the direction of the front side of the antenna during the query process S5, the wireless unit control circuit 16 continuously performs the query process S5.

In the temporary connection process S6, the wireless unit control circuit 16 performs communication with the video camera while the directivity direction of the directivity pattern 21 is set to the direction of the front side of the antenna. The wireless unit control circuit 16 executes a determination process S7 of measuring a time in which the communication with the video camera continues in the temporary connection state and determining whether communication with the video camera in the temporary connection state has continued for a predetermined time.

When the communication with the video camera in the temporary connection state has continued for the predetermined time, the wireless unit control circuit 16 executes a main connection transition process S8. When communication with the video camera has not continued for the predetermined time due to a factor such as that the operator has changed a direction of the array antenna 10 to select another video camera, the wireless unit control circuit 16 performs the query process S5 again.

In the main connection transition process S8, the wireless unit control circuit 16 instructs the phase control circuit 17 to transition to the main connection operation of narrowing the directivity direction of the directivity pattern 21 down to the video camera with which the connection is in progress. After the main connection transition process S8, the wireless unit control circuit 16 ends the connection setup process (S9). After the end of the connection setup process, the wireless unit control circuit 16 executes the imaging display process.

Next, a process of performing connection setup by selecting a video camera of a connection partner from a plurality of video cameras when the plurality of video cameras are in the same direction will be described. The connection setup process in the same direction is a process to be performed by the wireless unit control circuit 16, and three types of connection setup processes in the same direction will be described in this embodiment.

Although all of the three types of connection setup processes in the same direction are performed according to a flow of the process illustrated in FIG. 5, content of the query process S5 and the temporary connection process S6 is different in the connection setup process in the same direction. Hereinafter, details of the three types of connection setup processes will be described using FIGS. 6A to 9C.

FIGS. 6A to 6D illustrate states of a first connection setup process in the same direction. In the first connection setup process in the same direction, a video camera for which the elapsed time is short from a point in time at which a reset process has been performed is selected as a connection partner. Using FIGS. 6A to 6D, an example in which the image display device 9 changes a connection so that the connection to the video camera 5 is made from a state in which the connection to the video camera 1 is made when the video cameras 1 and 5 are located in the same direction when viewed from the image display device 9 will be described.

Figure 6A:
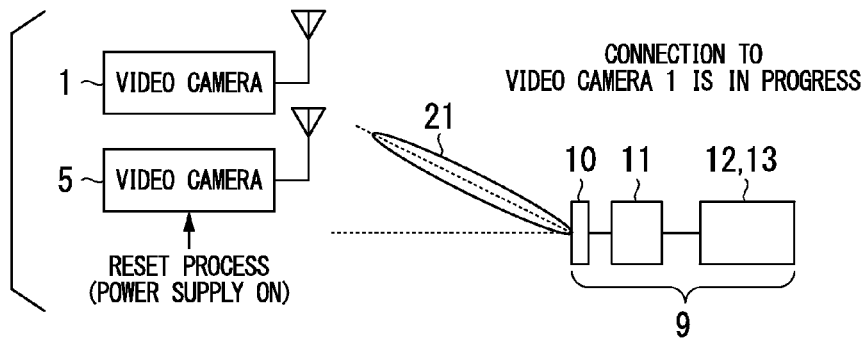
FIG. 6A is a reference diagram illustrating a state of the connection setup process in the first embodiment of the present invention.

FIG. 6A illustrates the state immediately before the first connection setup process. As illustrated, the image display device 9 can make a temporary connection with either of the video cameras 1 and 5 when the video cameras 1 and 5 are located in the same direction when viewed from the image display device 9. In this embodiment, when there is ID information used in a previous main connection among ID information collected in the query process (S5 of FIG. 5), the image display device 9 is connected to a wireless device having the ID information. When there is no ID information used in the previous main connection, the image display device 9 is connected to a wireless device having ID information first acquired in the query process.

In FIG. 6A, the image display device 9 is connected to the video camera 1, and the directivity direction of the array antenna 10 is controlled so that the directivity pattern 21 is in the direction of the video camera 1. Immediately before the first connection setup process, the operator instructs the video camera 5 with which the connection has been newly made to perform a reset process. Because the reset process of the video camera 5 in this embodiment is performed according to a power supplying process, the reset process to be performed immediately before the first connection setup process is performed according to the power supplying process of the video camera 5.

Figure 6B:
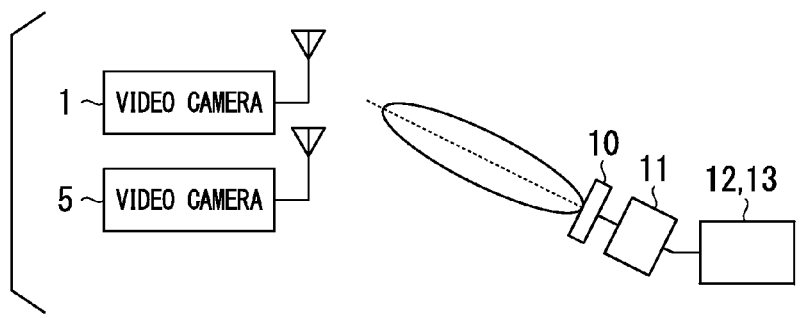
FIG. 6B is a reference diagram illustrating a state of the connection setup process in the first embodiment of the present invention.

FIG. 6B illustrates the state in which the front side of the array antenna 10 has been directed by the operator to the newly connected video camera 5 immediately after the start of the first connection setup process. The first connection setup process is started by pressing the operation switch 18 of the image display device 9. Because the directivity direction of the array antenna 10 is fixed to a front direction during the first connection setup process, the operator needs to direct the front side of the array antenna 10 in a direction of the newly connected video camera 5.

Figure 6C:
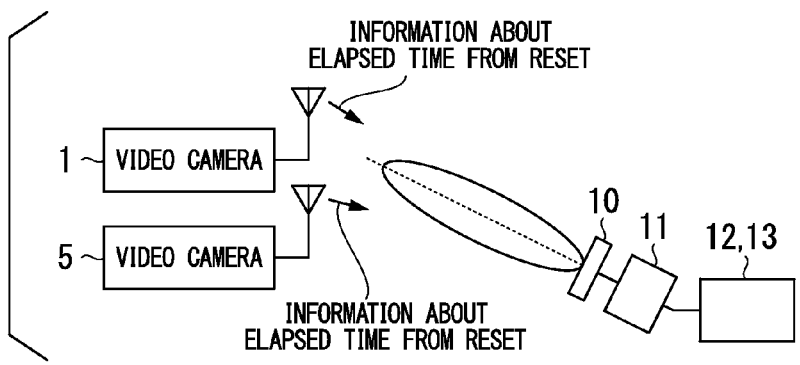
FIG. 6C is a reference diagram illustrating a state of the connection setup process in the first embodiment of the present invention.

FIG. 6C illustrates the state in which the image display device 9 performs the query process (S5 of FIG. 5) of collecting information about a connectable video camera from the video cameras 1 and 5. When there are a plurality of connectable video cameras, the wireless unit control circuit 16 in the wireless unit 11 of the image display device 9 collects elapsed time information representing an elapsed time from a point in time at which the reset process has been performed in addition to the ID information from the respective video cameras. The wireless unit control circuit 16 performs a temporary connection process (S6 of FIG. 5) of comparing elapsed times represented by the elapsed time information collected from the respective video cameras and setting the video camera for which the elapsed time is shortest as the connection partner. According to this operation, the video camera 5 on which the reset operation has been performed in FIG. 6A is selected as a partner of the temporary connection.

Figure 6D:
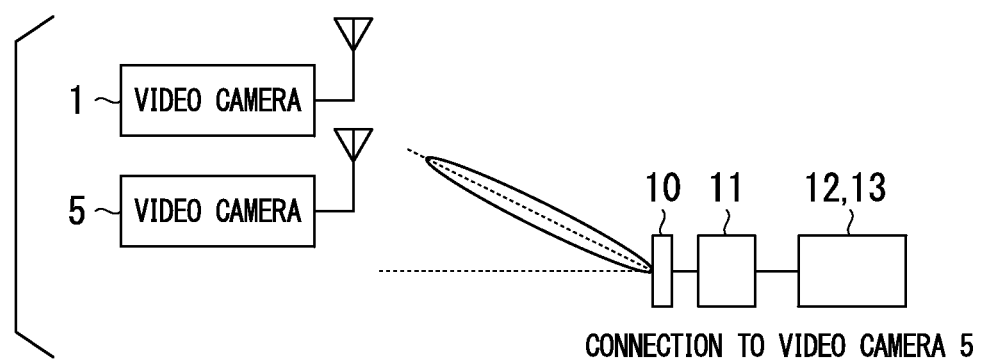
FIG. 6D is a reference diagram illustrating a state of the connection setup process in the first embodiment of the present invention.

FIG. 6D illustrates the state in which a predetermined time elapses after the temporary connection, the video camera 5 is selected as the connection destination, and the image display device 9 makes a main connection to the video camera 5. At this time, the directivity direction of the array antenna 10 is controlled in the direction of the video camera 5. According to the above-described procedure, a connection from the video camera 1 to the video camera 5 is switched.

Even when there are a plurality of video cameras in the same direction according to the above method, a connection to a desired video camera is possible by selecting the video camera for which the elapsed time is shortest from a point in time at which the reset process has been performed. Also, when the video camera and the image display device 9 are not connected before the start of the connection setup process differently from the above description, the connection setup process is started from the start of FIG. 6B. In this case, after the operator issues an instruction for the reset process of the video camera 5 and the video camera 5 performs the reset process, the operator presses the operation switch 18 of the image display device 9 and the image display device 9 starts the connection setup process, and thus the image display device 9 and the video camera 5 are connected.

FIGS. 7A to 7C, 8A, and 8B illustrate states of a second connection setup process in the same direction. When the video camera making the temporary connection is not a desired connection partner in the second connection setup process in the same direction, the desired video camera is selected as the connection partner after the operator has disconnected the connection by deteriorating the communication state. Using FIGS. 7A to 7C, 8A, and 8B, an example in which the image display device 9 changes a connection so that the connection to the video camera 5 is made from a state in which the connection to the video camera 1 is made when the video cameras 1 and 5 are located in the same direction when viewed from the image display device 9 will be described.

Figure 7A:
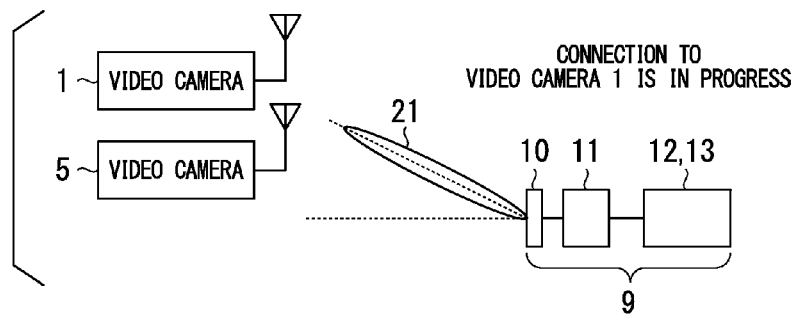
FIG. 7A is a reference diagram illustrating a state of the connection setup process in the first embodiment of the present invention.

FIG. 7A illustrates the state immediately before the second connection setup process. As illustrated, the image display device 9 can make a temporary connection with either of the video cameras 1 and 5 as described above when the video cameras 1 and 5 are in the same direction when viewed from the image display device 9. In this example, the image display device 9 is connected to the video camera 1, and the directivity direction of the array antenna 10 is controlled so that the directivity pattern 21 is in the direction of the video camera 1. At this time, differently from the first connection setup process in the same direction, no processing is performed in the video cameras 1 and 5.

Figure 7B:
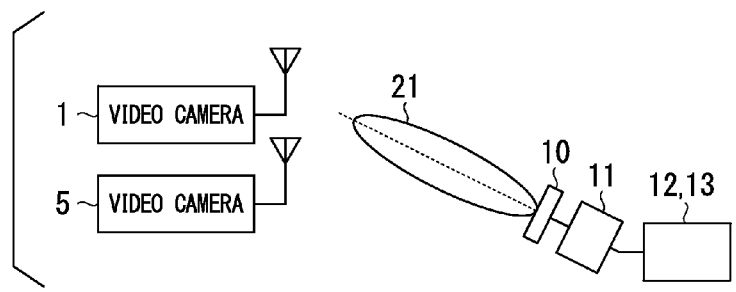
FIG. 7B is a reference diagram illustrating a state of the connection setup process in the first embodiment of the present invention.

FIG. 7B illustrates the state in which the operator directs the front side of the array antenna 10 in the direction of the video camera 5 after the operation switch 18 of the image display device 9 is pressed and the connection setup process is started. At this time, after the image display device 9 has performed a disconnection process with the video camera 1 according to the start of the connection setup process, the temporary connection to the video camera 1 which was a connection partner during a previous connection is made.

Figure 7C:
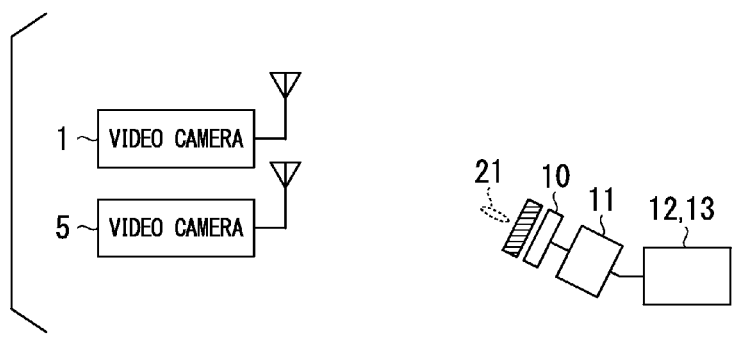
FIG. 7C is a reference diagram illustrating a state of the connection setup process in the first embodiment of the present invention.

FIG. 7C illustrates the state in which the operator disconnects the connection by deteriorating a communication environment during the temporary connection. The operator checks a partner of the temporary connection of the image display device 9. At this time, as described above, the operator checks whether the image display device 9 is connected to a desired video camera by observing the display monitor 13.

When the partner of the temporary connection is not a desired partner, the operator deteriorates the communication environment by covering the array antenna 10 of the image display device 9 by hand and instructs the image display device 9 to change the partner of the temporary connection. At this time, the wireless unit control circuit 16 in the wireless unit 11 of the image display device 9 determines whether the communication environment deteriorates according to measurement of reception strength or the like, and stops the temporary connection process for the video camera 1 upon determining that the communication environment deteriorates. Thereafter, the wireless unit control circuit 16 resumes processing from the query process (S5 of FIG. 5).

Figure 8A:
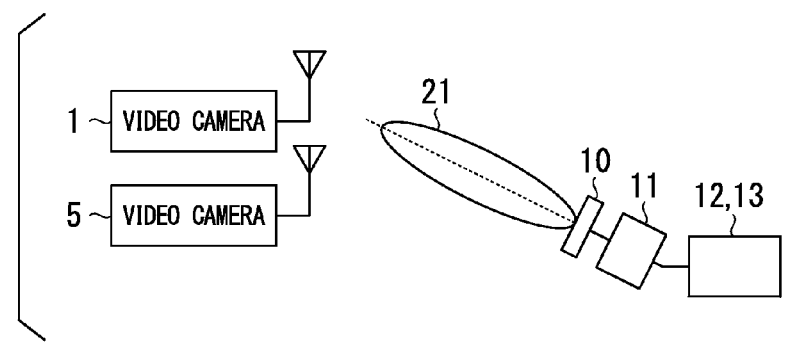
FIG. 8A is a reference diagram illustrating a state of the connection setup process in the first embodiment of the present invention.

FIG. 8A illustrates the state in which the video camera 5 has been selected as a partner of the temporary connection after the image display device 9 receiving the instruction for changing the partner of the temporary connection has performed the query process (S5 of FIG. 5). The wireless unit control circuit 16 collects ID information of a connectable video camera in the query process (S5 of FIG. 5), selects ID information different from ID information of a previous connection partner, and executes a temporary connection process with a video camera having the selected ID information.

Figure 8B:
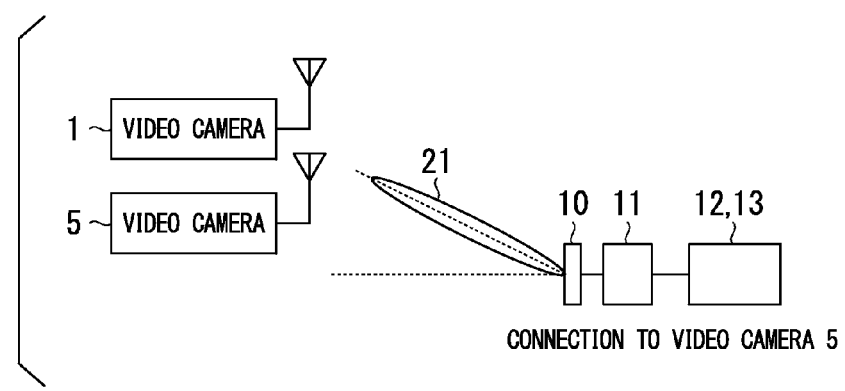
FIG. 8B is a reference diagram illustrating a state of the connection setup process in the first embodiment of the present invention.

FIG. 8B illustrates the state in which a predetermined time has elapsed from the start of the temporary connection to the video camera 5 and the transition to the main connection has been made. At this time, the directivity direction of the array antenna 10 is controlled in the direction of the video camera 5. According to the above-described procedure, switching of a connection from the video camera 1 to the video camera 5 is performed.

Figure 9A:
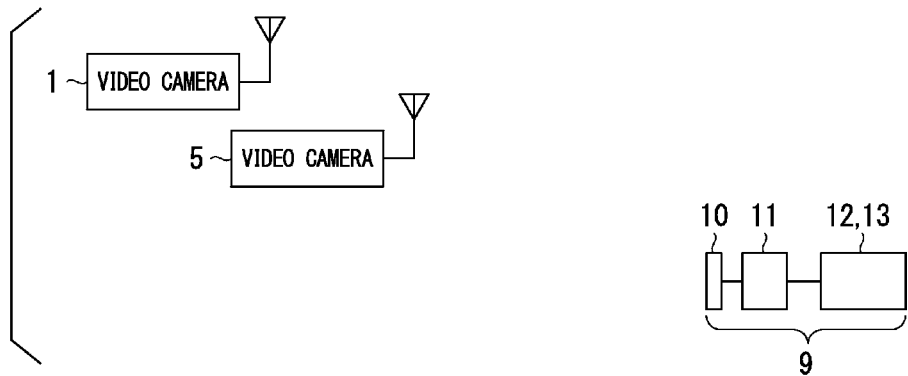
FIG. 9A is a reference diagram illustrating a state of the connection setup process in the first embodiment of the present invention.
Figure 9B:
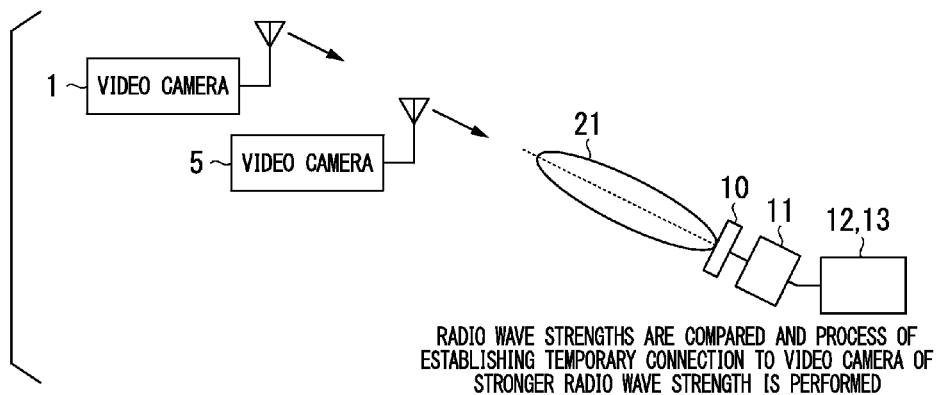
FIG. 9B is a reference diagram illustrating a state of the connection setup process in the first embodiment of the present invention.
Figure 9C:
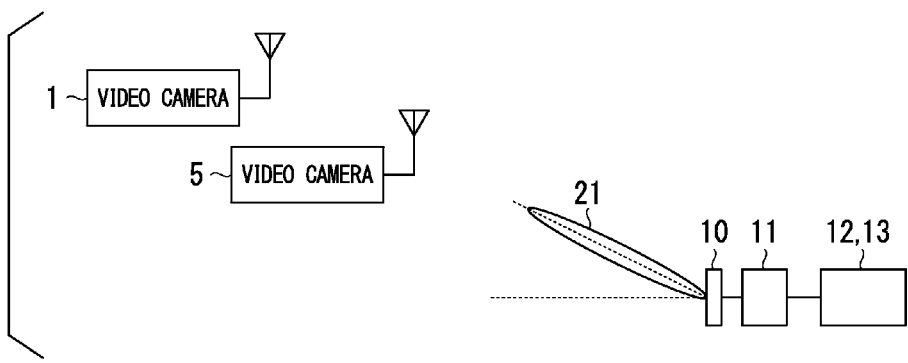
FIG. 9C is a reference diagram illustrating a state of the connection setup process in the first embodiment of the present invention.

FIGS. 9A to 9C illustrate states of a third connection setup process in the same direction. In the third connection setup process in the same direction, a video camera of stronger radio wave strength is selected as a connection partner. Using FIGS. 9A to 9C, the third connection setup process in the same direction will be described. Specifically, the image display device 9 measures radio wave strengths from the respective video cameras and selects the video camera of the stronger radio wave strength as the connection partner in the query process (S5 of FIG. 5).

FIG. 9A illustrates the state immediately before the third connection setup process. Such a state is a state in which the image display device 9 is not connected to either of the video cameras 1 and 5.

FIG. 9B illustrates the state in which the operator directs the front side of the array antenna 10 in the direction of the video camera 5 after the operation switch 18 of the image display device 9 is pressed and the connection setup process is started. The wireless unit control circuit 16 in the wireless unit 11 of the image display device 9 performs the query process (S5 of FIG. 5), and also measures the radio wave strength from each video camera at that time. When there are a plurality of connectable video cameras, the wireless unit control circuit 16 performs a temporary connection process using a video camera related to strongest radio wave strength among measured radio wave strengths as a connection partner. According to this operation, the image display device 9 is configured to select the nearer video camera 5 as the partner of the temporary connection.

FIG. 9C illustrates the state in which a predetermined time has elapsed from the start of the temporary connection to the video camera 5 and the transition to the main connection has been made. At this time, the directivity direction of the array antenna 10 is controlled in the direction of the video camera 5. According to the above-described procedure, in the connection setup process, the image display device 9 is configured to select the nearer video camera 5 as the partner of the temporary connection.

As described above, according to this embodiment, because the directivity direction of the array antenna 10 is controlled in a predetermined direction (a front direction of the array antenna 10 in this embodiment) during a period from when the image display device 9 starts the connection setup process to when the image display device 9 completes the connection setup process, it is possible to set up a connection to the other wireless device without involving the connection control device when there is another wireless device in the predetermined direction. Also, because the connection control device is unnecessary, it is possible to reduce cost of an image data communication system. Also, because the operator can directly designate a direction in which there is a connection partner in a state in which the operator recognizes the directivity direction of the array antenna 10 during connection setup, the operator can intuitively understand the connection partner and reduce a setting error.

Also, because the directivity direction of the array antenna 10 is fixed to the front direction of the array antenna 10 during the period from when the image display device 9 starts the connection setup process to when the image display device 9 completes the connection setup process, the operator can designate the connection partner by directing the front side of the array antenna 10 in a direction of the connection partner and the designation of the connection partner is facilitated.

Also, when there are a plurality of video cameras in the same direction when viewed from the image display device 9 in the first connection setup process, the image display device 9 can start the connection setup process after a reset process of a video camera desired to be connected by the operator is performed, thereby selecting a desired video camera as the connection partner.

Also, when there are a plurality of video cameras in the same direction when viewed from the image display device 9 and the video camera with which the connection is set up is not a desired connection partner in the second connection setup process, the operator can notify the image display device 9 of a request for changing the connection partner by covering the array antenna 10 by hand and change the connection partner.

Also, when there are a plurality of video cameras in the same direction when viewed from the image display device 9 in the third connection setup process, it is possible to automatically select a nearby video camera.

Second Embodiment

Figure 10:
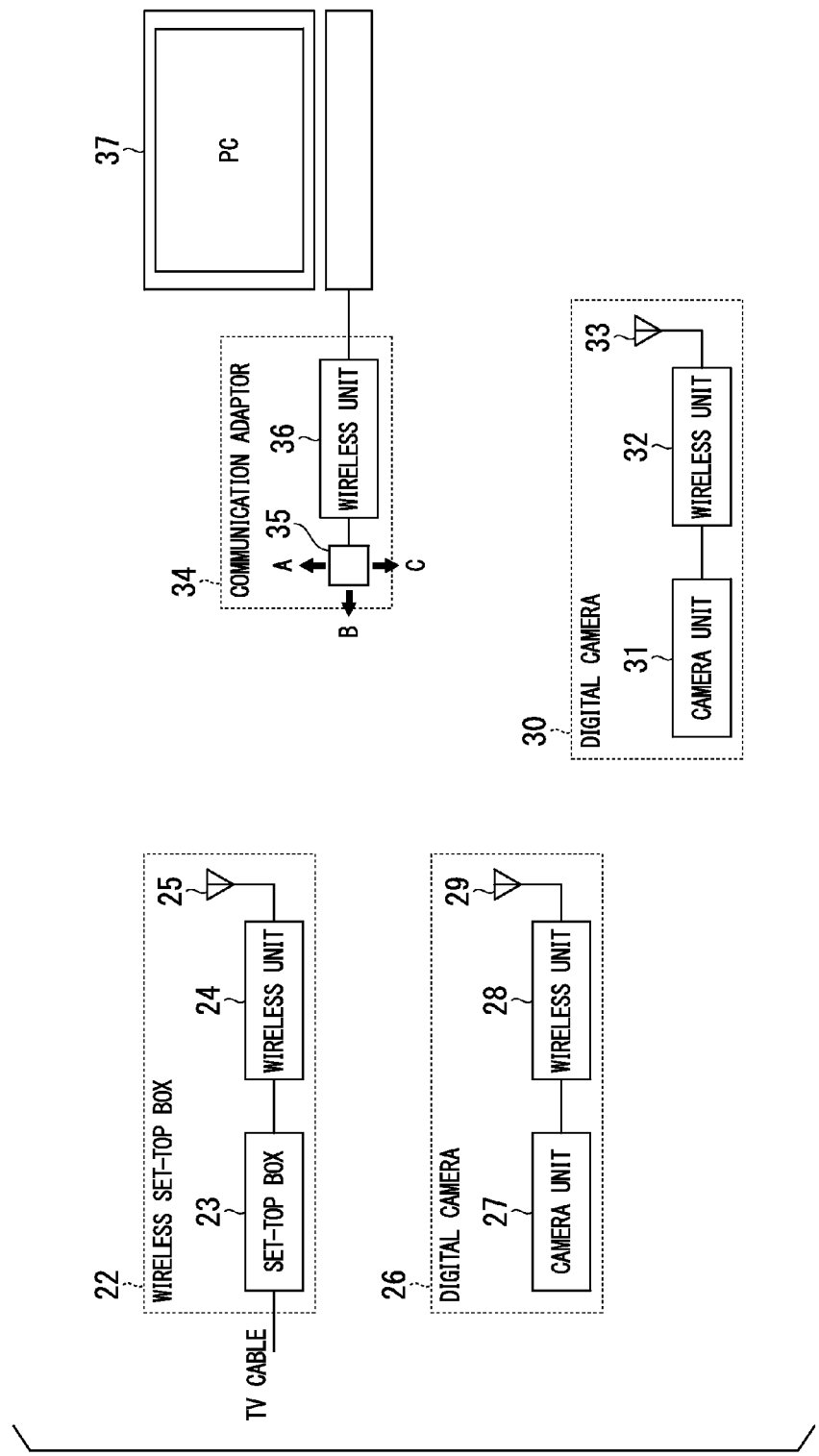
FIG. 10 is a block diagram illustrating a configuration of an image data communication system according to a second embodiment of the present invention.

Next, the second embodiment of the present invention will be described. An example in which the present invention is applied to an image data communication system including one set-top box which transmits an image in wireless communication, two digital cameras which transmit an image in wireless communication, and one personal computer (PC) to which a communication adaptor which receives a wirelessly transmitted image is connected and which displays the received image on a monitor will be described in this embodiment. FIG. 10 illustrates a configuration of the image data communication system according to this embodiment. First, the configuration and operation of the image data communication system will be described using FIG. 10.

(Configuration)

The image data communication system illustrated in FIG. 10 includes one wireless set-top box 22, two digital cameras (digital cameras 26 and 30), and one PC 37 to which a communication adaptor 34 is connected. The digital cameras 26 and 30 are devices which wirelessly transmit captured image data as communication data and have the same configuration. The communication adaptor 34 is an application example of the wireless device of the present invention.

The PC 37 performs wireless communication by establishing a connection to any one of the wireless set-top box 22 and the digital cameras 26 and 30 via the communication adaptor 34, and displays an image based on image data restored from the received communication data.

The wireless set-top box 22 includes a set-top box 23, a wireless unit 24, and an antenna 25. The set-top box 23 decodes a television (TV) signal input via a TV cable and outputs image data of a desired TV channel. The wireless unit 24 converts image data output from the set-top box 23 into communication data and wirelessly transmits the communication data via the antenna 25. The antenna 25 is a non-directional antenna.

The digital camera 26 includes a camera unit 27, a wireless unit 28, and an antenna 29. The camera unit 27 outputs image data by performing an imaging process. The wireless unit 28 converts the image data from the camera unit 27 into communication data and wirelessly transmits the communication data via the antenna 29. The antenna 29 is a non-directional antenna. The digital camera 30 includes a camera unit 31, a wireless unit 32, and an antenna 33. Because the configuration of the digital camera 30 is the same as the configuration of the digital camera 26, description thereof is omitted.

The communication adaptor 34 includes an array antenna 35 and a wireless unit 36. Because the configuration of the array antenna 35 is the same as the configuration of the array antenna 10 in the first embodiment, description thereof is omitted. The wireless unit 36 is connected to the array antenna 35 and performs control of directivity of the array antenna 35, a connection process with the wireless set-top box 22 and the digital cameras 26 and 30, and a process of receiving communication data transmitted from the wireless set-top box 22 and the digital cameras 26 and 30 after the connection. The communication data received by the wireless unit 36 is reconfigured as image data and the image data is transmitted to the PC 37. The PC 37 displays an image based on the image data.

The image data communication system of this embodiment performs a connection setup operation and an imaging display operation. The connection setup operation is an operation of selecting a connection partner (connection target) and performing a connection setup process. The operator indicates a direction of the connection partner using a direction switch (to be described later) of the communication adaptor 34 or the PC 37. The wireless unit 36 controls the directivity direction of the array antenna 35 in the indicated direction and performs a connection setup process with the connection partner in the indicated direction.

The imaging display operation is an operation in which the PC 37 displays an image based on image data received from the connection partner. A wireless signal wirelessly transmitted from the connection partner is received by the array antenna 35 as radio waves, and reconfigured as image data after the wireless signal is demodulated by the wireless unit 36 into communication data. The image data obtained through the reconfiguration is sent to the PC 37, and displayed on the monitor of the PC 37. During the imaging display operation, the directivity of the array antenna 35 is controlled toward the connection partner so that the reception of the wireless signal is optimally performed.

Figure 11:
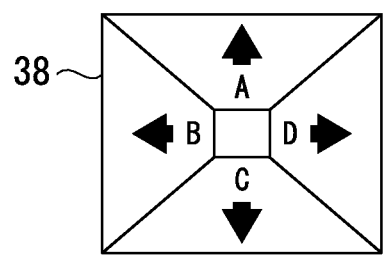
FIG. 11 is a configuration diagram illustrating a configuration of a direction switch provided in a wireless unit according to the second embodiment of the present invention.

The operator can indicate the directivity direction of the array antenna 35 of the communication adaptor 34 by operating the direction switch 38 or the PC 37 provided in the communication adaptor 34. FIG. 11 illustrates a configuration example of the direction switch 38 provided in the communication adaptor 34 so that the operator indicates the directivity direction of the array antenna 35. The direction switch 38 is attached to the wireless unit 36 and used to determine the directivity direction of the array antenna 35 according to an instruction of the operator. As illustrated in FIG. 11, the directivity directions will be described as four directions of A, B, C, and D in this embodiment.

The direction switch 38 includes individual switches SW-A to SW-D corresponding to the respective directions and light emitting diodes (LEDs) which are turned on in the vicinity of the individual switches SW-A to SW-D in order to indicate the determined direction. For example, when the respective devices are disposed as in FIG. 10, the B direction serves as the directivity direction of the array antenna 35 if a connection to the wireless set-top box 22 or the digital camera 26 is made and the C direction serves as the directivity direction of the array antenna 35 if a connection to the digital camera 30 is made. When the B direction is designated as the directivity direction, the operator presses the switch SW-B corresponding to the B direction. The wireless unit control circuit 16 within the wireless unit 36 displays the directivity direction by detecting the pressing of the switch SW-B and turning on the LED corresponding to the B direction.

Figure 12:
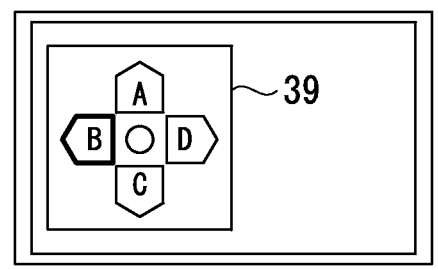
FIG. 12 is a reference diagram illustrating a display example of a directivity direction in the second embodiment of the present invention.

FIG. 12 illustrates a display example of the directivity direction displayed by the PC 37 on the monitor so as to indicate the directivity direction of the array antenna 35. The operator indicates the directivity direction by operating the PC 37. Indication content is transferred from the PC 37 to the wireless unit 36 and the directivity direction of the array antenna 35 is determined. Because details of the directivity direction or an indication method are well known, description thereof is omitted.

Figure 13:
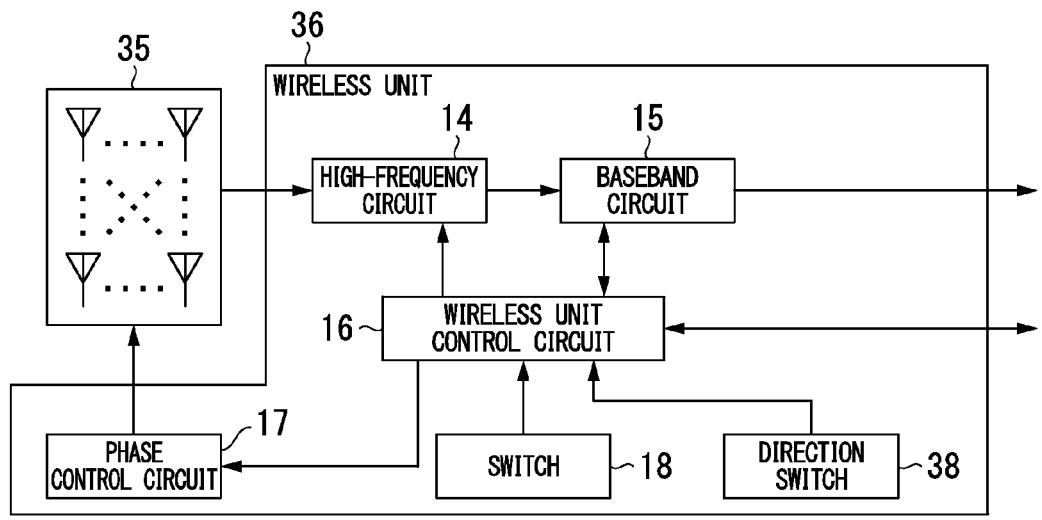
FIG. 13 is a block diagram illustrating a configuration of a communication adaptor according to the second embodiment of the present invention.

FIG. 13 illustrates a configuration of the communication adaptor 34. As illustrated, the communication adaptor 34 includes the array antenna 35 and the wireless unit 36. Because the array antenna 35 is the same as the array antenna 10 of the first embodiment, description thereof is omitted. The wireless unit 36 is a configuration in which a direction switch 38 is added to the wireless unit 11 of the first embodiment. The direction switch 38 is connected to the wireless unit control circuit 16 and can indicate the directivity direction of the array antenna 35 during connection setup according to an operation of the direction switch 38 by the operator. A direction indicated by the direction switch 38 is transferred to the phase control circuit 17 via the wireless unit control circuit 16, and the directivity direction of the array antenna 35 is controlled by the phase control circuit 17 in the indicated direction.

Figure 14:
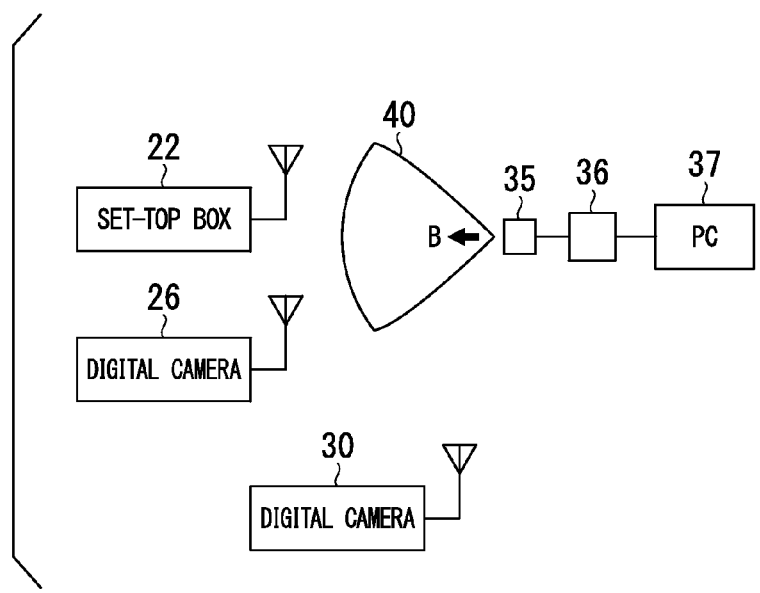
FIG. 14 is a reference diagram illustrating content of control of a directivity pattern of an array antenna in the connection setup process in the second embodiment of the present invention.

FIG. 14 illustrates content of a directivity pattern of the array antenna 35 in the connection setup process. In this embodiment, a directivity angle (half-value angle) is set to about 90 degrees because there are four directivity directions. FIG. 14 illustrates the case in which the B direction is selected as the directivity direction of the array antenna 35 in the connection setup process. At this time, in the directivity pattern 40, the directivity angle (half-value angle) is set to about 90 degrees in the B direction. In this case, the wireless set-top box 22 or the digital camera 26 is designated as the connection partner.

(Operation)

Figure 15:
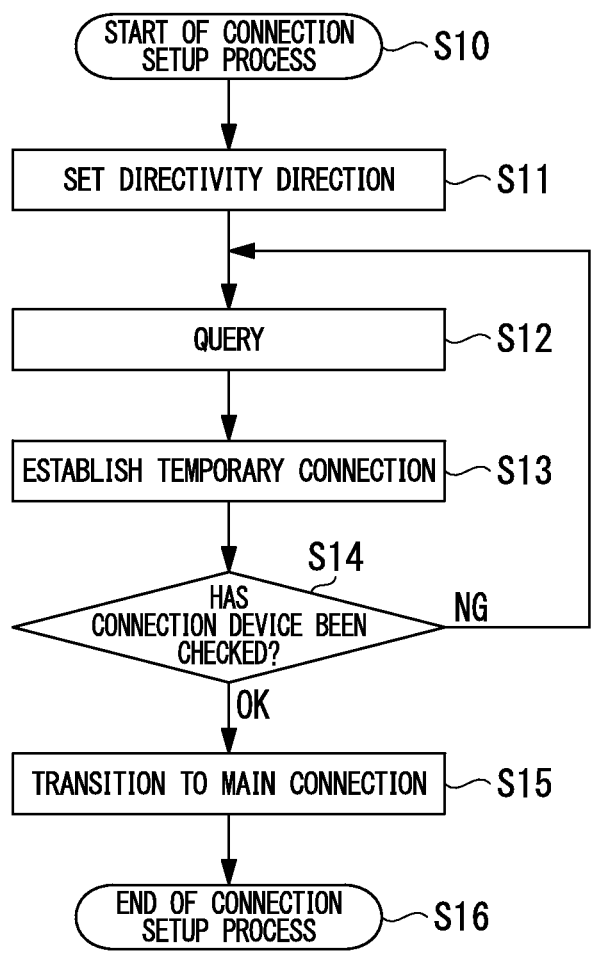
FIG. 15 is a flowchart illustrating an operation of a wireless unit control circuit of a communication adaptor according to the second embodiment of the present invention.
Figure 16:
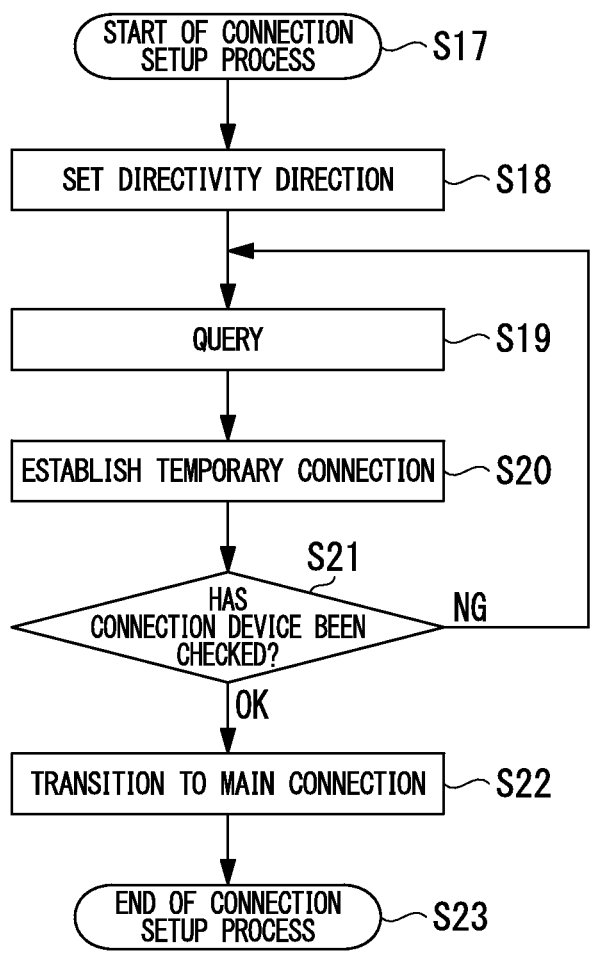
FIG. 16 is a flowchart illustrating an operation of the wireless unit control circuit of the communication adaptor according to the second embodiment of the present invention.

FIGS. 15 and 16 illustrate the operation of the wireless unit control circuit 16 of the communication adaptor 34 in the connection setup process. In this embodiment, the PC 37 has two types of operating modes of a connection destination-led operating mode in which an application to be executed (started) is determined according to a type (model) of connection partner determined in the connection setup process and an application-led operating mode in which a type of connection partner is selected according to an application in execution. The connection setup process in each operating mode will be described using FIGS. 15 and 16 in an example in which the respective devices are disposed as illustrated in FIG. 14.

FIG. 15 illustrates an operation of the wireless unit control circuit 16 in the connection destination-led operating mode in which an application to be executed according to a type of connection partner is determined. Hereinafter, an example in which the respective devices are disposed as illustrated in FIG. 14 and the digital camera 26 serves as the connection partner will be described. Also, the indication of the directivity direction of the array antenna 35 is performed according to an operation of the direction switch 38. Also, it is assumed that the PC 37 has a plurality of applications corresponding to a plurality of types of connection partners.

When the connection setup process is started by an instruction from the PC 37 (S10), the wireless unit control circuit 16 first executes a directivity direction setting process S11. The directivity direction setting process S11 is a process of detecting an operation of the direction switch 38 by the operator and directing the directivity of the array antenna 35 in the indicated direction. Based on a signal output from the direction switch 38, the wireless unit control circuit 16 detects the direction indicated by the operator and notifies the phase control circuit 17 of the detected direction. The phase control circuit 17 controls the directivity direction of the array antenna 35 in the direction of the notification from the wireless unit control circuit 16. As illustrated in FIG. 14, the switch SW-B of the direction switch 38 is selected because the digital camera 26 is located in the B direction. As a result, the directivity pattern of the array antenna 35 is set to the directivity pattern 40 of FIG. 14.

When the directivity direction setting process S11 ends, the wireless unit control circuit 16 executes a query process S12. In the query process S12, information for use in the connection setup process such as ID information set for each device is collected from the connectable device. When there is a connection partner in the directivity direction of the array antenna 35, the wireless unit control circuit 16 executes a temporary connection process S13. When the connection partner is not detected during the query process S12, the query process S12 is continuously performed.

In the temporary connection process S13, communication with the digital camera 26 is performed while the directivity pattern 40 is maintained. Information about the connection partner in the temporary connection process S13 is transmitted from the wireless unit control circuit 16 to the PC 37 and the information about the connection partner is displayed on the monitor of the PC 37. The operator checking the information displayed on the monitor of the PC 37 determines whether to make the main connection. When the determination result is input to the PC 37, the PC 37 notifies the wireless unit control circuit 16 of the determination result.

Upon receiving the determination result from the operator, the wireless unit control circuit 16 executes a connection device check process S14. In the connection device check process S14, the wireless unit control circuit 16 checks the determination result from the operator and determines the next processing content according to its content. When the determination result from the operator indicates that the main connection is made (OK), the wireless unit control circuit 16 executes a main connection transition process S15.

When the determination result from the operator indicates that a connection to another device is made (NG), the wireless unit control circuit 16 executes the query process S12 again. When the query process S12 is executed again, the next connection partner serves as the wireless set-top box 22. When there are a plurality of connector partner candidates, the connection partner is sequentially selected in predetermined order.

In this main connection transition process S15, the wireless unit control circuit 16 instructs the phase control circuit 17 to make the transition to the main connection operation which narrows down the directivity direction of the directivity pattern 40 toward the digital camera 26 during the connection. After the main connection transition process S15, the wireless unit control circuit 16 ends the connection setup process (S16). The wireless unit control circuit 16 executes the imaging display process after the end of the connection setup process.

After a determination of whether to make the main connection is made by the operator, the PC 37 starts application software suitable for a device selected by the operator. For example, when the digital camera 26 has been selected as the connection partner, the PC 37 checks that the connection partner is a digital camera based on ID information of the digital camera 26. Subsequently, the PC 37 starts digital photo software associated with the digital camera. In order to perform the above-described process, the PC 37 stores a correspondence relationship between device ID information and a device type and a correspondence relationship between the device type and application software to be started in a table or the like.

FIG. 16 illustrates an operation of the wireless unit control circuit 16 in the application-led operating mode in which a type of connection partner is determined according to an application in execution. Hereinafter, an example in which the respective devices are disposed as illustrated in FIG. 14 and the digital camera 26 serves as the connection partner will be described. Also, it is assumed that the directivity direction of the array antenna 35 is indicated according to an operation of the PC 37. Also, it is assumed that the PC 37 has a plurality of applications corresponding to a plurality of types of connection partners.

In the PC 37, it is assumed that an application related to the digital camera is in execution. The connection setup process with the digital camera is started by a connection start instruction from the application software (S17). When the connection setup process is started, a directivity direction setting process S18 is first performed. The directivity direction setting process S18 is a process of directing the directivity of the array antenna 35 in a direction set by the operator. The setting of the directivity direction by the operator is performed via the PC 37 as described using FIG. 12. Based on a signal output from the PC 37, the wireless unit control circuit 16 detects a direction indicated by the operator and notifies the phase control circuit 17 of the detected direction. The phase control circuit 17 controls the directivity direction of the array antenna 35 in the direction of the notification from the wireless unit control circuit 16. Because the digital camera 26 is located in the B direction as illustrated in FIG. 14, the B direction is indicated on the PC 37. As a result, the directivity pattern of the array antenna 35 is set to the directivity pattern 40 of FIG. 14.

When the directivity direction setting process S18 ends, the wireless unit control circuit 16 executes a query process S19. In the query process S19, information to be used in the connection setup process such as ID information set for each device is collected from a connectable device. Because the application in execution is application software related to the digital camera, a connection limited to the digital camera is made. Specifically, the wireless unit control circuit 16 collects only ID information of the digital camera and selects only the digital camera as the partner of the temporary connection in the course of the query process S19.

A type of device serving as the connection partner is determined according to a type of application software at a point in time at which the application software has issued a connection start instruction. In the present invention, the device serving as the connection partner is the digital camera because the application software related to the digital camera has issued the connection start instruction. The PC 37 outputs information about the application software in execution to the wireless unit control circuit 16. The wireless unit control circuit 16 checks that the application software in execution is application software related to the digital camera based on the information output from the PC 37. Subsequently, the wireless unit control circuit 16 recognizes the digital camera associated with the application software related to the digital camera as the connection partner, and collects only ID information of the digital camera. In order to perform the above-described process, the wireless unit control circuit 16 stores a correspondence relationship between a type of application software and a type of device as the connection partner and a correspondence relationship between the device type and device ID information in a table or the like.

Because the digital camera in the B direction is only the digital camera 26, the digital camera 26 is automatically selected as the partner of the temporary connection. Subsequently, the wireless unit control circuit 16 executes a temporary connection process S20. When it is difficult to detect a type of connection partner corresponding to the application software in execution during the query process S19, the query process S19 is continuously performed.

In the temporary connection process S20, communication with the digital camera 26 is performed while the directivity pattern 40 is maintained. When a plurality of digital cameras have been found in the query process S19, information about the connection partner in the temporary connection process S20 is transmitted from the wireless unit control circuit 16 to the PC 37 and the information about the connection partner is displayed on the monitor of the PC 37. The operator checking information displayed on the monitor of the PC 37 determines whether to make a main connection. When the determination result is input to the PC 37, the PC 37 notifies the wireless unit control circuit 16 of the determination result.

Upon receiving the determination result from the operator, the wireless unit control circuit 16 executes a connection device check process S21. When a plurality of digital cameras have been found in the query process S19 the wireless unit control circuit 16 checks the determination result from the operator and determines the next processing content according to its content in the connection device check process S21. When the determination result from the operator indicates that the main connection is made (OK), the wireless unit control circuit 16 executes a main connection transition process S22.

When the determination result from the operator indicates that a connection to another device is made (NG), the wireless unit control circuit 16 executes the query process S19 again. Also, when the number of digital cameras found in the query process S19 is only one, the notification of information about the connection partner in the temporary connection process S20 is not provided to the PC 37, the operator does not make a determination of whether to make the main connection, and the main connection transition process S22 is executed. Because a digital camera in the B direction is only the digital camera 26 in the case of the state of FIG. 14, the main connection transition process S22 is executed.

In the main connection transition process S22, the wireless unit control circuit 16 instructs the phase control circuit 17 to make the transition to the main connection operation of narrowing the directivity direction of the directivity pattern 21 down to the digital camera 26 with which the connection is in progress. After the main connection transition process S22, the wireless unit control circuit 16 ends the connection setup process (S23). After the end of the connection setup process, the wireless unit control circuit 16 executes the imaging display process.

As described above, according to this embodiment, convenience is improved because it is possible to operate an application corresponding to a type of connection partner after the connection partner has been determined when the communication adaptor 34 is connectable to different types of devices (an electronic camera, a set-top box, etc.). Also, the convenience is improved because the communication adaptor 34 can select a device suitable for an application in operation (for example, selects the electronic camera when a photo viewer is in operation in the PC 37) as the connection partner when there are a plurality of different types of devices (an electronic camera, a set-top box, etc.) in the same direction during connection setup.

Also, when there are a plurality of different types of devices (an electronic camera, a set-top box, etc.) in different directions when viewed from the image display device 9 during connection setup, the operator can establish a connection to a desired device by setting the directivity direction of the array antenna 35 in a direction indicated by an operation of the direction switch 38 or the PC 37 to perform a connection setup process.

Although the embodiments of the present invention have been described above with reference to the drawings, specific configurations are not limited to the embodiments, and design modifications can also be made without departing from the scope of the present invention. For example, although a directivity direction of an array antenna is controlled in a front direction of the array antenna during connection setup in the above description, the present invention is not limited thereto. It is only necessary for the directivity direction of the array antenna to be a direction recognizable by the operator.

The present invention can be widely applied to wireless devices. Because a directivity direction of a variable directivity antenna is controlled in a predetermined direction during a period from when a connection setup section starts a connection setup process to when the connection setup section completes the connection setup process, it is possible to set up a connection to another wireless device without involving a connection control device when the other wireless device is in the predetermined direction.

What is claimed is:

1. A wireless device comprising:
a variable directivity antenna having variable directivity characteristics;
a generation section configured to generate, based on radio waves transmitted from another wireless device before completion of the connection setup process and received by the variable directivity antenna, control information to be used in a connection setup process, the generation section being configured to generate, based on radio waves transmitted from the other wireless device after the completion of the connection setup process and received by the variable directivity antenna, data for data processing;
a connection setup section configured to perform the connection setup process for the other wireless device identified from the control information; and
an antenna control section configured to set a directivity direction of the variable directivity antenna to a predetermined direction during a period from when the connection setup section starts the connection setup process to when the connection setup section completes the connection setup process.

2. The wireless device according to claim 1, further comprising:
a determination section configured to determine whether a communication environment deteriorates,
wherein the connection setup section stops the connection setup process for the other wireless device when the determination section determines that the communication environment deteriorates while the connection setup process for the other wireless device is performed.

3. The wireless device according to claim 2, wherein, upon stopping the connection setup process for a first wireless device, the connection setup section performs the connection setup process for a second wireless device different from the first wireless device.

4. The wireless device according to claim 1, wherein, when a plurality of other wireless devices have been identified from the control information, the connection setup section identifies an elapsed time from when the other wireless devices have been reset based on the control information, and performs the connection setup process by giving priority to the other wireless device for which the elapsed time is short rather than the other wireless device for which the elapsed time is long.

5. The wireless device according to claim 1, wherein, when a plurality of other wireless devices are identified from the control information, the connection setup section performs the connection setup process for a wireless device related to strongest radio wave strength of radio waves received from the plurality of other wireless devices.

6. The wireless device according to claim 1, further comprising:
a direction reception section configured to receive direction information serving as an indicator of the directivity direction of the variable directivity antenna from an operator,
wherein the antenna control section sets the directivity direction of the variable directivity antenna to a direction represented by the direction information during the period from when the connection setup section starts the connection setup process to when the connection setup section completes the connection setup process.

7. The wireless device according to claim 1, further comprising:
a processing section configured to process the data by starting any one of a plurality of applications which process the data generated by the generation section,
wherein the processing section starts an application corresponding to the other wireless device after the connection setup process.

8. The wireless device according to claim 1, further comprising:
a processing section configured to process the data by starting any one of a plurality of applications which process the data generated by the generation section,
wherein, when a plurality of other wireless devices have been identified from the control information, the connection setup section performs the connection setup process for the other wireless device corresponding to the application started by the processing section.

9. The wireless device according to claim 1, wherein the antenna control section sets the directivity direction of the variable directivity antenna to a predetermined direction and limits a spread of directivity characteristics of the variable directivity antenna to within a predetermined range.

10. The wireless device according to claim 1, wherein the antenna control section sets the directivity direction of the variable directivity antenna to a direction perpendicular to a plane on which the variable directivity antenna is disposed during the period from when the connection setup section starts the connection setup process to when the connection setup section completes the connection setup process.

11. The wireless device according to claim 1, further comprising:
a display section configured to display image data which is the data generated by the generation section,
wherein the generation section generates the image data from radio waves transmitted from an image transmission device which is the other wireless device after the completion of the connection setup process and received by the variable directivity antenna, and
wherein the connection setup section performs the connection setup process for the image transmission device identified from the control information.

12. A wireless connection method comprising:
a generation step of generating, based on radio waves transmitted from another wireless device before completion of the connection setup process and received by a variable directivity antenna, control information to be used in a connection setup process, the generation step further generating, based on radio waves transmitted from the other wireless device after the completion of the connection setup process and received by the variable directivity antenna, data for data processing;
a connection setup step of performing the connection setup process for the other wireless device identified from the control information; and
an antenna control step of setting a directivity direction of the variable directivity antenna to a predetermined direction during a period from when the connection setup process is started to when the connection setup process is completed in the connection setup step.

13. A wireless communication system which wirelessly transmits data from a data transmission device and displays the data on a data display device, comprising:
the data transmission device including a wireless unit configured to transmit data; and
a data reception device including:
a variable directivity antenna having variable directivity characteristics;
a generation section configured to generate, based on radio waves transmitted from a wireless unit of the data transmission device before completion of the connection setup process and received by the variable directivity antenna, control information to be used in a connection setup process, the generation section being configured to generate, based on radio waves transmitted from the data transmission device after the completion of the connection setup process and received by the variable directivity antenna, data for data processing;
a connection setup section configured to perform the connection setup process for the data transmission device identified from the control information; and
an antenna control section configured to set a directivity direction of the variable directivity antenna to a predetermined direction during a period from when the connection setup section starts the connection setup process to when the connection setup section completes the connection setup process.

* * * * *